July 4, 1961  C. A. CHAYNE  2,990,901
SWING AXLE SUSPENSION
Filed Nov. 6, 1959  4 Sheets-Sheet 1
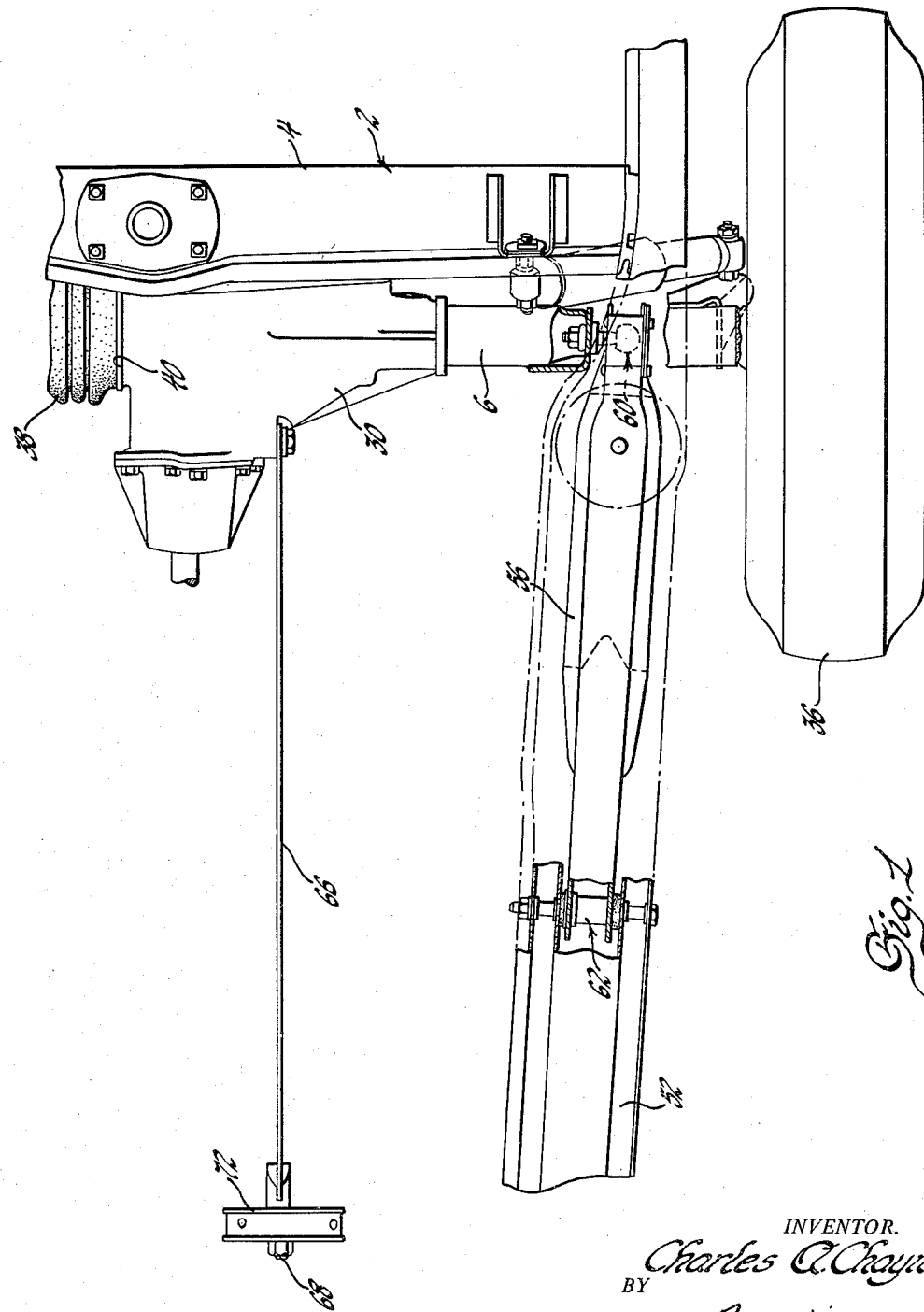
INVENTOR.
Charles A. Chayne
BY
W. F. Wagner
ATTORNEY July 4, 1961
C. A. CHAYNE
2,990,901
SWING AXLE SUSPENSION
Filed Nov. 6, 1959
4 Sheets-Sheet 2
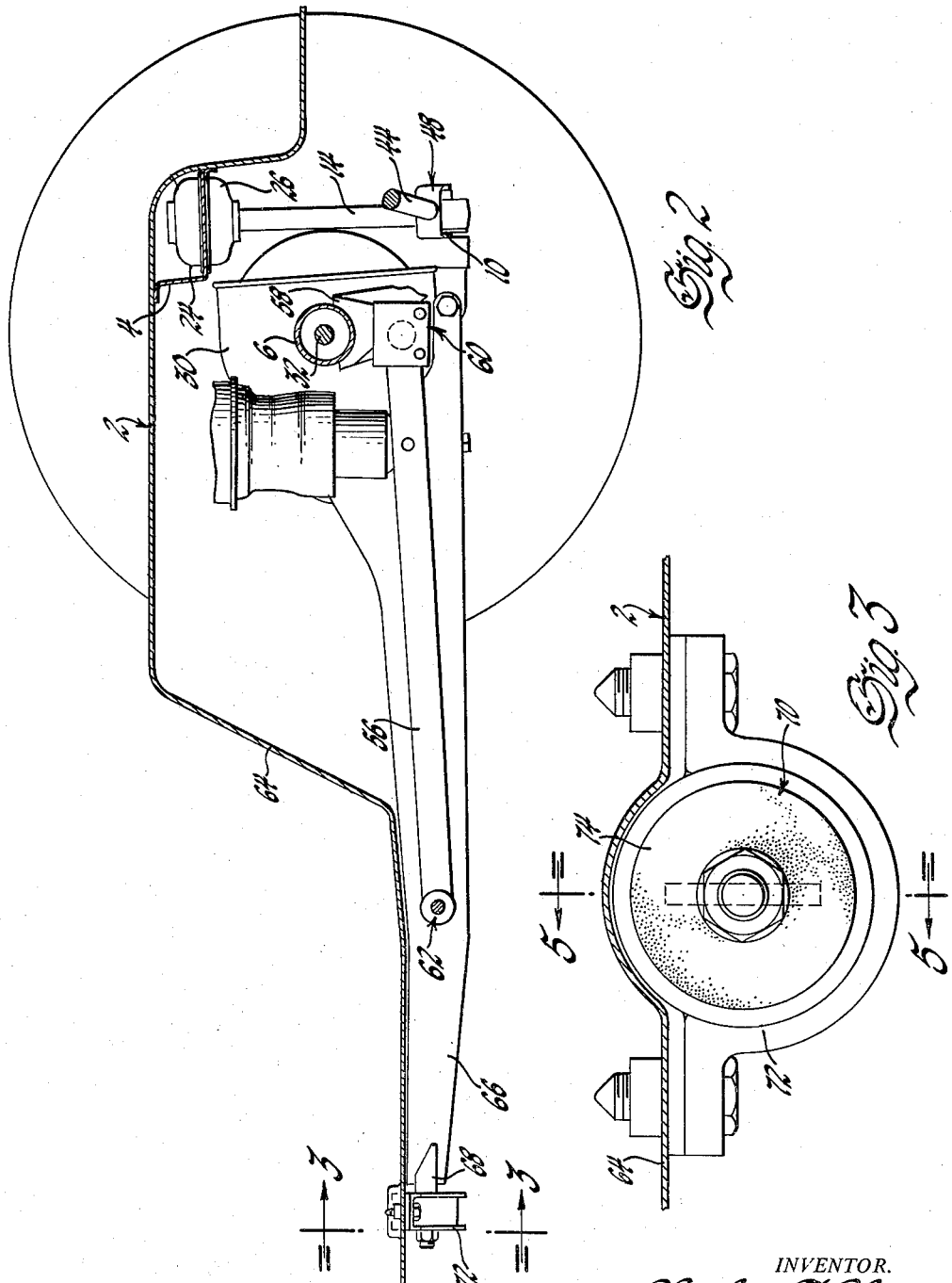
INVENTOR.
Charles A. Chayne
BY
W. F. Wagner
ATTORNEY July 4, 1961
C. A. CHAYNE
2,990,901
SWING AXLE SUSPENSION
Filed Nov. 6, 1959
4 Sheets-Sheet 3
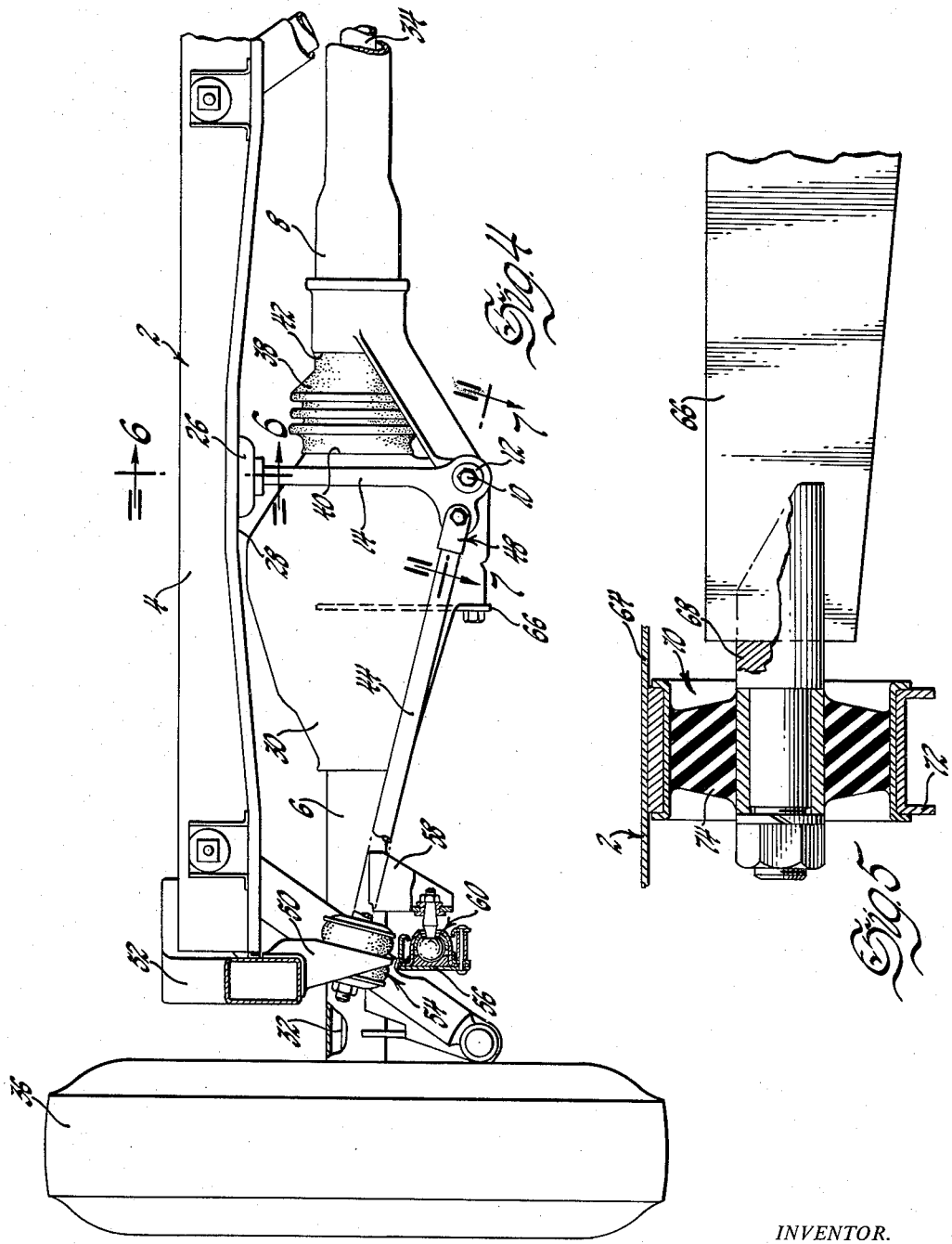
INVENTOR.
Charles A. Chayne
BY
W. F. Wagner
ATTORNEY July 4, 1961 C. A. CHAYNE 2,990,901
SWING AXLE SUSPENSION
Filed Nov. 6, 1959 4 Sheets-Sheet 4

INVENTOR.
Charles A. Chayne
BY
W. H. Wagner
ATTORNEY

United States Patent Office 2,990,901
Patented July 4, 1961

2,990,901
SWING AXLE SUSPENSION
Charles A. Chayne, Bloomfield Hills, Mich., assignor to General Motors Corporation, Detroit, Mich., a corporation of Delaware
Filed Nov. 6, 1959, Ser. No. 851,290
8 Claims. (Cl. 180—73)

This invention relates to vehicle suspension and more particularly to swing axle suspension for vehicle driving wheels.

The invention concerns improvements in swing axle suspensions of the type wherein wheel carrying half axles are connected to a common pivot supported on the vehicle sprung mass, and includes thrust links arranged in a direction of vehicle travel which are pivotally connected to the axles and the vehicle sprung mass.

It has already been proposed to provide an arrangement of the type described wherein the axle carrier or mounting includes a vertical pillar which extends into a plurality of vertically spaced annular resilient mounts on the sprung mass which permit rotation of the pillar and the axles connected thereto about the vertical axis of the mounts. This type of arrangement also contemplates laterally spaced longitudinally extending thrust links which in side elevation are inclined downwardly toward the front of the vehicle. When arranged in the manner described, the suspension exhibits differing geometric characteristics under conditions of parallel ride deflection and roll deflection, respectively. Since the thrust links are inclined downwardly toward the front of the vehicle, both a forward and upward component of movement is imparted to each associated wheel under conditions of compression deflection. Conversely, rebound deflection causes the wheel to move with a downward and rearward component. Therefore, under conditions of parallel ride deflection, both of the driving wheels deflects through a common vertical plane which is not parallel with the vertical transverse plane of the axis defined by the pillar mounts, but which is accommodated by elastic deformation of the mounts. Under conditions of roll deflection, the initial inclination of the thrust links causes one wheel to move forwardly and upwardly while the other wheel moves downwardly and rearwardly. Since the half axles are pivoted together on a horizontal axis, they form a rigid system in plan view. Therefore, the geometric behavior occurring during roll deflection requires that both axles and the pillar rotate in plan view about the axis defined by the annular mounts.

Because of relatively high driving and braking moments generated in systems of the type described, prior art structures utilizing pillar type axle carriers have required very substantial vertical spacing between the annular mounts. In a typical example, the axle carrying pillar extends substantially above the differential housing and is surrounded at its opposite ends by a pair of vertically spaced annular mounts. While this arrangement is satisfactory insofar as suspension characteristics are concerned, in practice the upper extremity of the pillar and mounts protrude to such an extent above the normal floor level of the vehicle body as to produce an undesirable if not intolerable obstruction. This disadvantage is particularly unsatisfactory when the adjacent floor space is intended for passenger occupancy, as for example in station wagon type vehicles. Similarly, a projection of any substantial magnitude is highly undesirable when the surrounding space forms the luggage compartment, as in conventional passenger vehicles.

An object of the present invention is to provide an improved swing axle suspension.

A further object is to provide a swing axle suspension of the type described which eliminates obstructions or projections in the vehicle body floor.

Still another object is to provide a swing axle suspension utilizing a single vertical pillar type axle carrier, wherein the carrier is flexibly connected to the vehicle sprung mass entirely below the normal vehicle floor level.

A still further object is to provide a structure of the stated character including horizontally disposed means arranged to impart controlled resistance to fore and aft deflection of the pillar and axles.

Yet a further object is to provide a structure of the stated character wherein the horizontal means comprises a blade spring member rigidly connected to one axle and having its forward end connected to the vehicle sprung mass by means of a flexible connection which is so arranged as to offer relatively great resistance to vertical movement of the spring and relatively slight resistance to longitudinal movement thereof.

Yet a further object is to provide a suspension of the type described wherein the minor dimension of the blade spring is disposed in a vertical longitudinal plane and the flexible connection permits the spring to rotate on a horizontal axis during deflection of the half axle to which the spring is rigidly connected, while rotation of both axles about the vertical pillar is accommodated by bending flexure of the spring.

These and other objects, advantages, and features of the invention will become more fully apparent as reference is had to the accompanying specification and drawings wherein:

FIG. 1 is a partial plan view of a vehicle suspension according to the invention;

FIG. 2 is a side elevation view partly in section of the structure shown in FIG. 1;

FIG. 3 is an enlarged fragmentary view looking in the direction of arrows 3—3 of FIG. 2;

FIG. 4 is a rear end elevational view of the suspension;

FIG. 5 is an enlarged fragmentary view, partly in section, looking in the direction of arrows 5—5 of FIG. 3;

Figure 6:
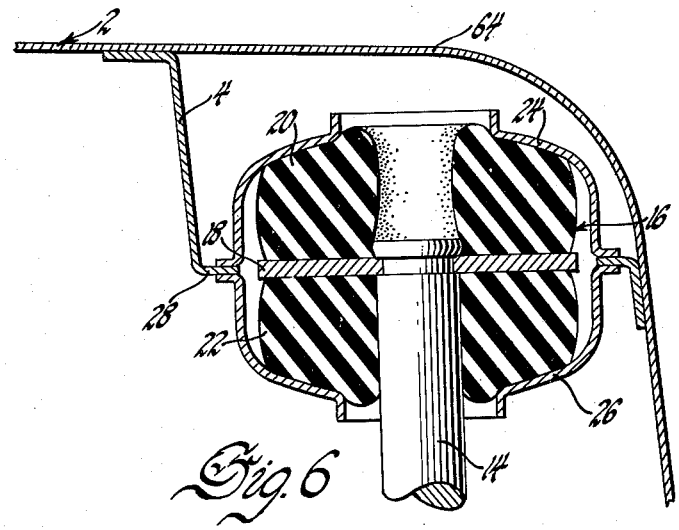
FIG. 6 is an enlarged fragmentary view, partly in section, looking in the direction of arrows 6—6 of FIG. 4.

Referring now to the drawings and particularly FIGS. 1, 2, and 4, there is shown a vehicle suspension arrangement wherein the reference numeral 2 designates generally an integral body and frame which includes a transverse channel support 4. As seen best in FIG. 4, a pair of laterally oppositely extending axle housings 6 and 8 are disposed beneath support 4 and are pivotally connected together at their inboard ends by a longitudinally extending pivot shaft 10, the rearward end of which extends through a rubber bushed sleeve 12 carried in the lower end of a vertically extending pillar 14. Near its upper end, pillar 14 is provided with an elastic connector assembly 16 comprising a disc 18 affixed to the shaft and a pair of rubber buffer elements 20 and 22 disposed respectively above and below the disc. The entire elastic connector 16 is disposed in a pair of abutting cup members 24 and 26 which are attached to the lower wall 28 of support 4 as by welding.

The axle configuration shown is of the type wherein housing 6 is provided with an enlarged inboard casing 30 in which is disposed conventional differential gearing, not shown. Each axle housing 6 and 8 contains a driving axle 32 and 34, respectively, which are operatively connected at their outboard ends, respectively, to driving wheel 36 and the driving wheel at the opposite side of the vehicle, not shown. The inboard end of axle 32 is connected directly to the differential gearing in the conventional manner, while the inboard end of driving axle 34 is operatively connected to the differential by conventional universal joints, not shown, located within the flexible boot 38 disposed between the inboard faces 40 and 42 of axle housings 6 and 8, respectively.

Since the entire axle system is suspended from support 4 by pillar 14 and therefore would have no inherent stability, an inclined lateral strut 44 functions to impart lateral stability to the axle system without introducing any significant restriction upon relative movement thereof in other directions. To accomplish this purpose, the lower end of the pillar is provided with a second rubber bushed sleeve 46 which is engaged by a pin and clevis 48 on the lower end of strut 44. The outer end of strut 44 in turn is connected to a depending bracket 50 on the body sill 52 by means of an elastic buffer assembly 54.

As seen best in FIG. 1, the axle assembly incorporates a generally longitudinally extending thrust link 56, the rearward end of which is connected to a depending bracket 58 on axle 6 by means of a ball joint assembly 60. The forward end of link 56 in turn is connected to sill 52 by means of a rubber bushed pin joint assembly 62 located somewhat below the vertical level of ball joint 60. It will be understood that a similar link located at the opposite side of the vehicle is mounted to axle housing 8 and the opposite sill in an identical manner. While the structure thus far described is basically similar to the prior art, a fundamental difference exists in that the upper extremity of vertical pillar 14 terminates below the normal floor level 64 of the vehicle superstructure immediately vertically adjacent the pillar. In the prior art, corresponding pillars extend substantially above the corresponding floor level in order to assure that the driving and braking moments are distributed over an adequate base, it being understood that the greater the vertical extent of the pillar, the smaller will be the forces produced. However, although this arrangement is quite satisfactory from a purely functional standpoint, it will be recognized that as the pillar is extended in length, a progressively greater vehicle floor obstruction results. In the present invention, the need for a pillar of extended length is overcome by rigidly attaching to the enlarged casing 30 of axle housing 6 a longitudinally extending strut member 66 which is capable of lateral bending and torsional deflection but rigid with respect to other load application. In the illustrated form, strut 66 takes the form of a blade spring, the minor dimension of which is normal to a vertical longitudinal plane laterally offset from but parallel with the vertical longitudinal midplane of the vehicle. At its forward end, member 66 is formed with a shaft portion 68 which is connected to annular rubber mounting 70. Mounting 70 is secured to the vehicle floor by means of a U-shaped bracket 72. As seen best in FIG. 5, the mounting 70 is so formed that longitudinal movement of strut 66 produces shear loading of the rubber mass 74, while rotary movement of the strut about the axis of shaft 68 induces torsional loading, and angular movement of the strut induces compression loading. By reference to FIG. 2, it will be seen that torque reaction moments exerted by axles 6 and 8 are distributed over a base defined by the distance between mounting 68 and elastic connection 16 by which the upper end of pillar 14 is secured to channel 4. Because of the extended longitudinal distance of this base, connector 16 may be located extremely low in relation to the axle assemblies and therefore totally eliminate any objectionable projection above the normal level of vehicle floor 64.

Figure 7:
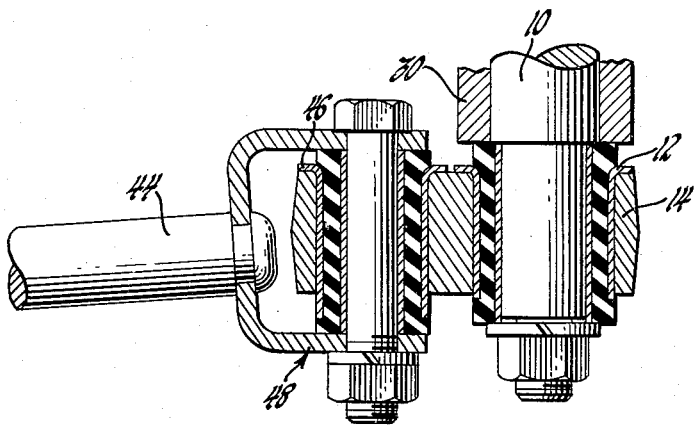
FIG. 7 is an enlarged fragmentary view, partly in section, looking in the direction of arrows 7—7 of FIG. 4.
Figure 8:
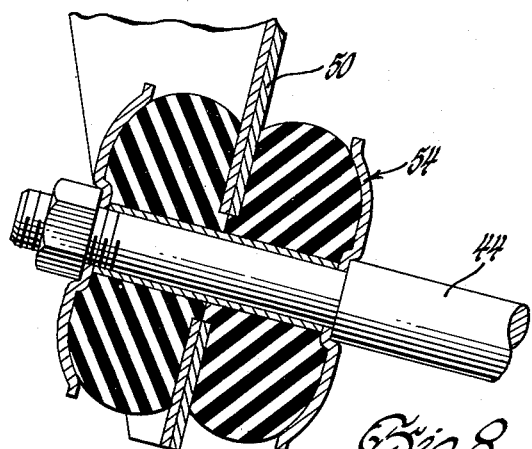
FIG. 8 is an enlarged fragmentary view, partly in section, showing a detail of the construction shown in FIG. 4.

In addition to eliminating the objectionable upward projection of pillar 14, strut member 66 also allows the lower end of the pillar to be flexibly connected to the common pivot shaft 10 for axle housings 6 and 8 by means of rubber bushed sleeve 12 (FIG. 7) and thus increase the points of articulation at which noise and shock isolation may be introduced into the system.

In order to more fully understand the invention, a description of the mode of operation follows. Considering first the condition of parallel ride deflection, it will be evident from FIG. 2 that upon uniform upward deflection of both wheels, both wheels and axle housings 6 and 8 will move forwardly and upwardly owing to the fact that the rubber bushed pin joints are located below the wheel centers. This movement of the portion of casings 30 to which the rearward end of blade spring 66 is attached will cause both vertical angular movement as well as bodily forwardly movement of the spring relative to mounting 70. Since the principal movement of the forward end of spring 66 is longitudinally of the axis of rubber mount 70, such movement is readily absorbed because the resistance of rubber mass 72 to shear deflection is relatively low. At the same time, any torque reaction in the axle assembly which would tend to cause vertical angular movement of the blade spring about the axis of rotation of the wheels is strongly resisted because the rubber mount 70 offers substantial resistance to compression deflection. Considering now the case of roll deflection, wherein one wheel moves up while the other moves down, it will be apparent due to the placement of pin joints 62 that a forward component of movement is imparted to the upwardly deflecting wheel, while a rearward component is imparted to the downwardly deflecting wheel. Hence, the one half axle is constrained to move forwardly and the other rearwardly. Since the two axles are connected together by common pivot 10 to form a rigid system in plan view, the total angular movement of the two axles in plan view occurs about the vertical axis defined by pillar 14. To accommodate this horizontal angular movement, the central body portion of the blade spring bows laterally under the influence of bending deflection, either to the left or right depending upon the direction of angular movement of the axles. Inasmuch as spring 66 is extremely thin in lateral dimension, it will be evident that relatively slight resistance to such movement is offered. It will also be apparent that spring 66 must accommodate periodic vertical oscillation of axle housing 6 resulting from normal deflection of wheel 20. This motion is readily accommodated by a combination of torsional loading of the spring 66 and of the rubber mass 72 of resilient mount 70.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a motor vehicle having a sprung mass, swing axle suspension comprising, a vertically extending pillar having its upper end resiliently connected to said sprung mass, a pair of laterally oppositely directed half axles disposed beneath said sprung mass and hinged together on a common longitudinal pivot member, flexible means on the lower end of said pillar surroundingly engaging said pivot member, a pair of laterally spaced longitudinally extending thrust links pivotally connected at their opposite ends to said axles and sprung mass respectively, a horizontally disposed blade rigidly connected at one end to one of said axles and flexibly connected at the other end to said sprung mass, said blade having its vertical dimension greater than its transverse dimension whereby to resist fore and aft swinging movement of said axles about the resilient connection between the upper end of said pillar and said sprung mass.

2. In a motor vehicle having a sprung mass including a flat floor portion, swing axle suspension comprising, a depending pillar having its upper end resiliently connected to said sprung mass below said flat portion, a pair of laterally oppositely directed half axles disposed beneath said sprung mass and hinged together on a common longitudinal pivot member, flexible means on the lower end of said pillar surroundingly engaging said pivot member, a pair of laterally spaced longitudinally extending thrust links pivotally connected at their opposite ends to said axles and sprung mass respectively, a horizontally disposed blade rigidly connected at one end to one of said axles and flexibly connected at the other end to said sprung mass, said blade having its vertical dimension greater than its transverse dimension whereby to resist fore and aft swinging movement of said axles about the resilient connection between the upper end of said pillar and said sprung mass.

3. The structure set forth in claim 2 wherein said horizontally disposed blade is a leaf spring, the minor dimension of which lies in a horizontal plane parallel with the horizontal centerline of the vehicle.

4. The structure set forth in claim 2 wherein the axle connected to said blade has differential gearing disposed therein.

5. In combination with the sprung mass of a motor vehicle, a depending pillar having its upper end resiliently connected to said sprung mass, a pair of laterally oppositely directed wheel carrying swing axles disposed forwardly of said pillar and beneath said sprung mass, a longitudinally extending pivot member hinging said axles together on a common axis spaced vertically below the axis of rotation of said wheels, means forming a flexible sleeve in the lower end of said pillar engaging the rearward extremity of said pivot, a pair of laterally spaced thrust links pivoted at their rearward ends to said axles and at their forward ends to said sprung mass, a laterally directed vertically inclined strut connecting the lower end of said pillar with one side of the sprung mass to resist lateral swinging movement of said axles, and a longitudinally extending leaf spring disposed forwardly of said axles, said spring having its rearward end rigidly connected to one of said axles and its forward end flexibly connected to said sprung mass, said spring being formed with a vertical dimension greater than the transverse dimension so as to yield to lateral bending and torsional loading but resist vertical bending and thereby resist fore and aft swinging movement of said axles about the resilient connection between the upper end of said pillar and said sprung mass, while allowing independent vertical swinging movement of said half axles about the pivot member and horizontal swinging of both axles about the axis of said pillar.

6. The structure set forth in claim 5 wherein said spring lies in a vertical plane and increases progressively in vertical dimension from front to rear.

7. The structure set forth in claim 5 wherein the flexible connection between the forward end of said spring and said sprung mass comprises a shear mounted annular elastic element, the axis of which is co-axial with said pivot member.

8. The structure set forth in claim 5 wherein the pivotal connections for the forward ends of said thrust links are located below the pivotal connections for the rearward ends thereof.

References Cited in the file of this patent
UNITED STATES PATENTS

| | | |
|---|---|---|
| 2,055,975 | Haltenberger | Sept. 29, 1936 |
| 2,806,542 | Scherenberg et al. | Sept. 17, 1957 |
| 2,806,543 | Nallinger | Sept. 17, 1957 |
| 2,806,714 | Scherenberg et al. | Sept. 17, 1957 |